United States Patent

[11] 3,537,403

| [72] | Inventors | Kristupas Daugirdas<br>Wilmette;<br>Charles J. Jechort, Jr., Berwyn, Illinois |
|---|---|---|
| [21] | Appl. No. | 744,543 |
| [22] | Filed | July 12, 1968 |
| [45] | Patented | Nov. 3, 1970 |
| [73] | Assignee | Vapor Corporation<br>Chicago, Illinois<br>a corporation of Delaware |

[54] DOOR OPERATOR
17 Claims, 7 Drawing Figs.

[52] U.S. Cl. .................................................. 105/341
[51] Int. Cl. ............................................................ B61d
19/00, E05f 1/00

[50] Field of Search ........................................... 49/324;
105/341, 342, 343

[56] References Cited
UNITED STATES PATENTS

| 1,067,787 | 7/1913 | Rowntree | 105/341 |
| 1,161,942 | 11/1915 | McGill | 105/341 |
| 1,788,409 | 1/1931 | Rowntree | 105/341 |
| 2,034,415 | 3/1936 | Parvin | 105/341 |

Primary Examiner—Arthur L. La Point
Assistant Examiner—Richard A. Bertsch
Attorney—Norman Aon Witt

ABSTRACT: Door operator for a vehicle to be mounted vertically in the wall of the vehicle substantially above the floor.

INVENTORS
KRISTUPAS DAUGIRDAS
CHARLES J. JECHORT JR.
BY
ATTORNEY

INVENTORS
KRISTUPAS DAUGIRDAS
CHARLES J. JECHORT JR.
BY
ATTORNEY

DOOR OPERATOR

This invention relates in general to an electric door operator for public conveyances, and more particularly to an electric door operator constructed to be mounted in the side wall of a vehicle adjacent to a door opening, and still more particularly to a door operator for use in rail type passenger vehicles.

Modern streamlined rail car design has necessitated changes in operating components for the cars. One of the operating components is the door operator employed for opening and closing the doors that allow ingress and egress of passengers. Heretofore, the door operators have been mounted overhead of the doors, as well as on the floor under seats adjacent the doors. No space is available to mount the door operator overhead in modern streamlined cars, and the seating arrangement often does not permit mounting of the unit under a seat. Preferably, the floor space under the seats should be unobstructed for easier cleaning and maintenance. Further, access to door operators under the seat or overhead would be relatively inconvenient for maintenance and service, and the door operators under the seats are more susceptible to contamination by dirt and debris.

The door operator of the present invention is intended to obviate the above difficulties in that it is arranged in a compact package that is mountable within the said wall of a vehicle adjacent the door opening, thereby also making it readily accessible for maintenance and also easily exchangeable. Thus, the door operator of the present invention is mountable in the wall of a car instead of the conventional location on the floor under the seat or overhead in a door head or box. In the usual railway car, the body is defined by a floor, side and end walls, and a ceiling. Door openings are provided in the side walls, and normally the doors for the door openings are slidably mounted to move into the door opening from a pocket formed in the side wall of the car adjacent to the opening. A pocket extension is provided for receiving the door operator of the present invention, which extension is directly adjacent and in communication with the door pocket. Preferably on the inner wall of the car, an access door permits accessibility to the door operator mounted in the pocket extension. The door operator is mounted well above the floor and generally in the central area between the top and bottom edges of the side wall.

The door operator of the present invention is mounted on a panel that permits ease in exchangeability. The operator is also essentially mounted along the vertical axis and has a depth no greater than the distance between the inner and outer panels of the side wall. A reversible motor is mounted on the mounting plate with its rotational axis aligned generally along the vertical. A gear box is secured to the lower end of the motor and drivingly connected therewith and provided with an output shaft extending normal to the axis of rotation of the motor and generally transverse of the side wall. A drive arm is mounted on the gear box output shaft and pivotally connected at its free end to one end of a curvate connecting link. The connecting link is formed to facilitate the compactness of the door operator. A stub shaft extends from the mounting plate at a location below the gear box and in parallel alignment with the output shaft of the gear box for pivotally receiving a multiplying lever. The lever includes a hub bearingly received on the stub shaft and having a first arm extending therefrom and pivotally connected at its free end to the other end of the connecting link, and a second arm extending therefrom and interconnected with the door. A connecting rod is pivotally connected at one end to the door and at the other end to the free end of the second arm.

A plurality of switches are provided to control operation of the door, which switches are operated by movement of the multiplying lever and the drive arm. A cam is adjustably mounted on the multiplying lever to actuate during the opening cycle a first switch for cushioning movement near the end of the opening cycle and a second switch for deenergizing the motor at the end of the opening cycle. A switch is provided operable by the drive arm to deenergize the motor at the end of the closing cycle. A stop is mounted on the mounting panel to coact with the drive arm and stop the drive arm-connecting link pivot in an over center position at the end of the closing cycle to lock the door against movement toward the opening position. In order to provide a safety feature for at least some of the doors in the vehicle, a manually operable emergency release handle may be provided on one or more of the operators to enable backing the drive arm-connecting link pivot back over center, so that the door may be manually opened. As a further safety precaution, operation of the emergency release handle also opens the circuit to the motor and prevents power operation of the door operator during manual operation thereof.

Accordingly, it is an object of the present invention to provide an improved door operator for a passenger vehicle that is compact and mountable within a side wall of the vehicle in substantially spaced relationship above the floor.

Another object of this invention resides in the provision of a door operator mountable along the vertical axis in the side wall of a vehicle and being easily accessible for maintenance and exchangeability.

Other objects, features and advantages of the invention will be apparent from the following detailed disclosure, taken in conjunction with the accompanying sheets of drawings, wherein like reference numerals refer to like parts, in which.

Figure 1:
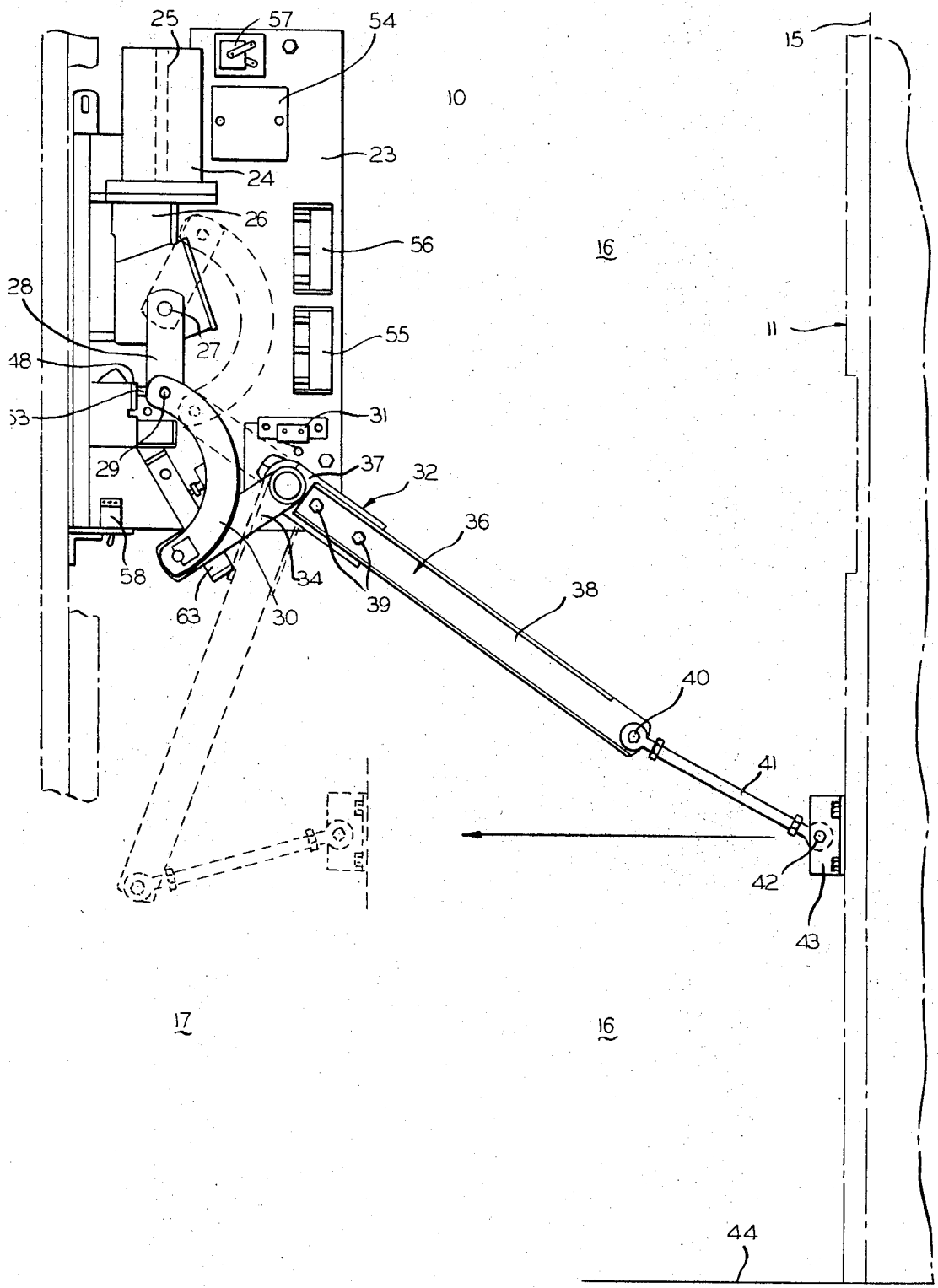
FIG. 1 is a side elevational view of the door operator according to the invention and as connected to a door of a vehicle, illustrating its relationship to the floor, and showing the components in a solid line where the door is in closed position and the components in dotted lines where the door is in open position.
Figure 3:
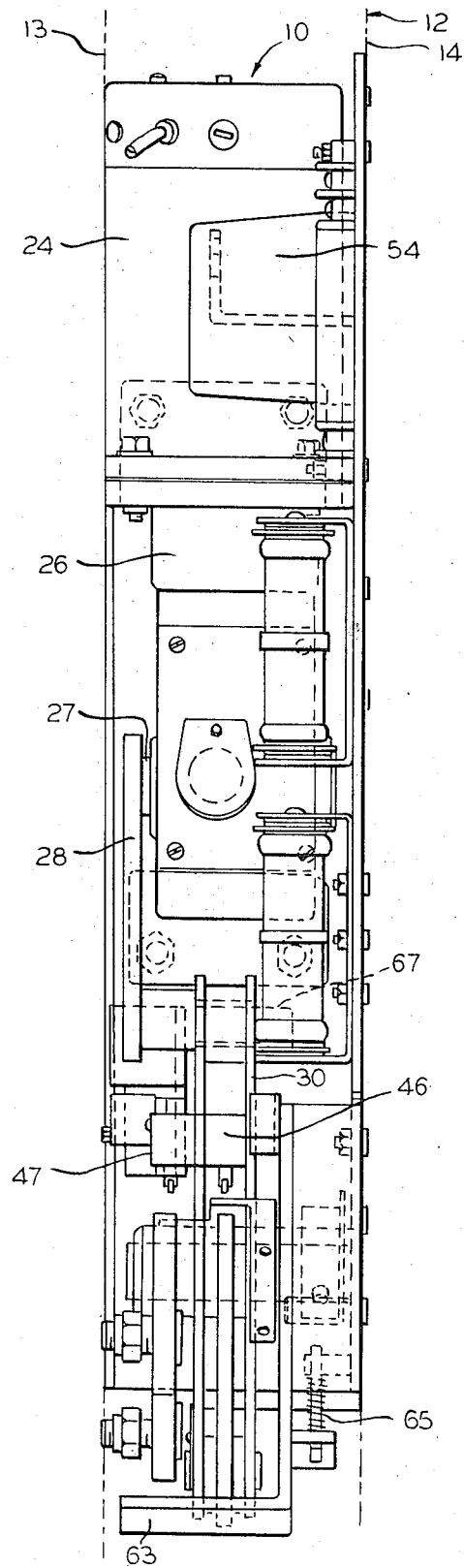
FIG. 3 is an end elevational view of the door operator of FIG. 2, looking at it from the door opening side.

Referring now to the drawings, and in particular to FIG. 1, the door operator of the present invention, generally designated by the numeral 10 is shown as it would be mounted within a wall of a vehicle and in driving engagement with a door 11. FIG. 3 shows the door operator as mounted in a side wall 12 having inner and outer panels 13 and 14. The door operator 10 is capable of moving the door 11 between open and closed positions relative to the door opening 15 in the side wall. Adjacent the door opening in the side wall is a pocket 16 into which the door 11 is slidably moved, when the door is moved to its open position relative to the door opening 15. A pocket extension 17 is located directly adjacent to the pocket 16 and employed for receiving the door operator 10.

Figure 5:
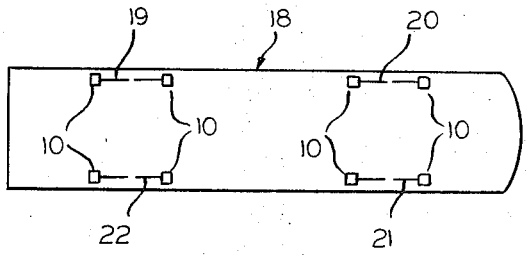
FIG. 5 is a diagrammatic plan view of a car illustrating the position of doors and door operators.
Figure 4:
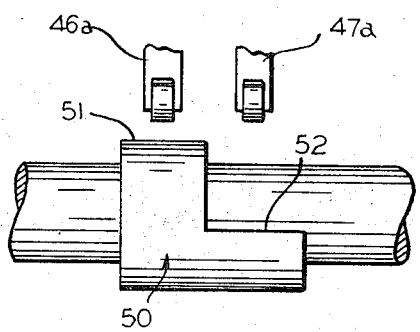
FIG. 4 is a fragmentary enlarged view taken substantially along line 4-4 of FIG. 2 and illustrating the cam and cam-operated switches actuatable during the closing cycle of the door.

FIG. 1 illustrates the door operator of the present invention operable to drive a single door or panel or biparting doors; although it may operate another panel of a biparting door by means of suitable additional linkage. A typical door and door operator arrangement in a vehicle or car is illustrated in FIG. 5, wherein the car 18 includes biparting door sets 19, 20, 21 and 22 arranged for openings in the side walls of the car. Each biparting door set includes a pair of panels, each panel of which is operable by a door operator 10. It should be appreciated that any other sort of arrangement may be employed, such as where a single operator would, through suitable linkage, control operation of both panels of a biparting door set.

The door operator 10 includes all its components mountable on a mounting plate 23, that is secured to suitable structural elements within the side wall of the car in such a way that the entire door operator on the mounting plate may be easily removed for exchangeability by removal of a relatively small number of fasteners. A reversible motor 24 is suitably secured to the mounting plate 23, so that its shaft and axis of rotation extends substantially vertically with respect to the car. A motor shaft is represented by the numeral 25 and is drivingly connected to a gear box 26 fastened to the lower end of the motor 24. An output shaft 27 extends from the gear box along an axis perpendicular to the axis of the motor 24 and transverse of the side wall of the car. Any suitable gear reduction ratio may be provided in the gear box.

The power of the output shaft 27 is transmitted to a drive arm 28 that is fastened on for rotation with the output shaft 27 and normally movable through an arc of about 150°. The drive arm is shown in solid lines in FIG. 1 and in FIG. 2 in its position when the door 11 is closed, and is shown in FIG. 1 in dotted lines in its position when the door is fully opened. The drive arm is straight and pivotally connected at its free end by a pivot 29 to one end of a connecting link 30. The connecting link 30 is arcuate in shape (essentially crescent shape) whereby the convex side faces the door opening of the car at all times. During movement of the connecting link 30 to its door open position, as shown in dotted lines in FIG. 1, it will be appreciated that it clears the housing of the gear box 26 and slightly wraps around one side of the housing when it is in the door open position.

A stub shaft 31 is fastened to the mounting plate 23 below the gear box 26 and extends parallel to the output shaft 27 of the gear box. A multiplying lever 32 is pivotally mounted on the stub shaft 31 and interconnected between the connecting link 30 and the door 11.

The multiplying lever 32 includes a hub 33 bearingly received on the shaft 31, a first arm 34 extending from the hub and pivotally connected at its free end to the other end of the connecting link 30 by means of a pivot connection 35, and a second arm 36 that is connected to the door. The second arm 36 is angularly related to the first arm 34. Further, the second arm 36 is sectional and includes a first section 37 that is integral with the hub 33 and a second section 38 that is drivingly connected to the door. Suitable bolts 39 permit operation of the sections and facilitate the removal of the entire door operator for exchange purposes. While not shown, a suitable access door would be provided on the inner panel of the side wall aligned with the door operator to permit access therewith for maintenance and exchangeability.

The free end of the multiplying lever second arm 36 is pivotally connected at 40 to a connecting rod 41, which is in turn pivotally connected at its other end at 42 to a bracket 43 fixed to the edge of the door 11. Thus, rotation of the drive arm 28 will cause pivoting of the multiplying lever 32 through the connecting link 30 to apply force to the connecting rod 41 and selectively move the door between open and closed positions relative to the door opening. As seen particularly in FIG. 1, the floor of the car is designated by the numeral 44 to illustrate the spacing of the door operator above the floor and to one side of the door and door opening.

Figure 6:
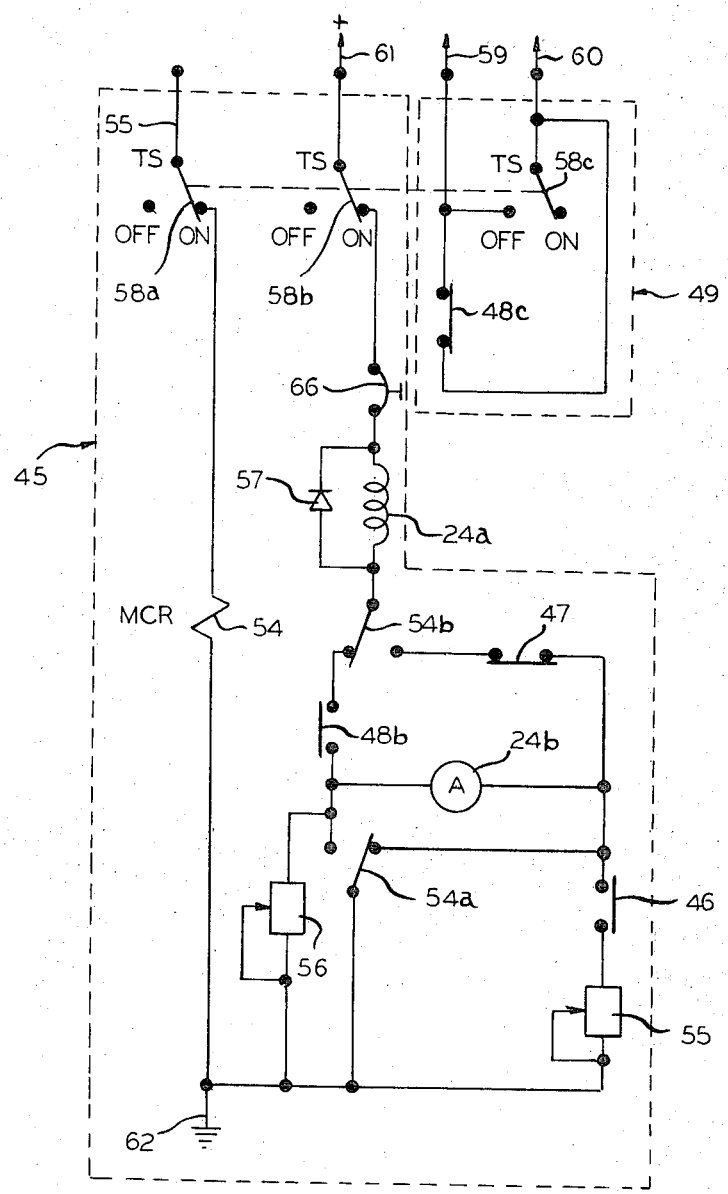
FIG. 6 is an electrical schematic diagram of the motor control and signal circuitry for the door operator according to the invention.

In order to control the operation of the door operator, a motor control circuit 45, FIG. 6, is provided, which includes a plurality of limit switches 46, 47 and 48. The motor control circuit 45 together with a signal circuit 49 (FIG. 6) is interconnected into the main switching circuitry of the car to coact with the operation of the other doors and the operation of the car. The limit switches 46, 47 and 48 are operable by the movement of the multiplying lever 32 and the drive arm 28.

Referring particularly to FIGS. 1 to 4, the limit switches 46 and 47 are mounted side by side on the mounting plate 23 and adjacent to the hub 33 of the multiplying lever 32. Switch arms 46a and 47a, of the limit switches are actuated by a cam 50 that is adjustably mounted on the multiplying lever 32 for relative rotational adjustment therewith in initially adjusting the operation at the proper time relative to the position of the door 11. The cam 50 includes a cam lobe 51 operable to actuate the switch arm 46a of the limit switch 46, and a cam lobe 52 to operate the switch arm 47a of the limit switch 47. The cam lobes 51 and 52 are offset so that the cam lobe 51 actuates the limit switch 46 first, which switch cuts in a cushioning action for the motor 24 adjacent the end of the opening cycle. The cam lobe 52 next actuates the limit switch 47 to open the circuit to the motor 24 and stop the door operator when the door has reached its fully opened position.

During the closing cycle of the door operator, the drive arm 28 actuates the switch arm 48a of the limit switch 48 to open the circuit to the motor 24 and stop the door operator just as the drive arm 28 abuts against a stop 53 supported by the mounting plate 23. At this position, the drive arm connecting link pivot connection 29 is over center with respect to the output shaft axis 27 and the connecting link-multiplying lever pivot connection 34 to lock the door in closed position. Attempted movement of the door toward open position only drives the linkage and drive arm against the stop 53.

Referring now to the motor control circuit, the motor 24 is represented by the field 24a and the armature 24b. A motor control relay 54 is connected in the door opening train line 55 that extends from the master relay of the car electrical system. The motor control relay includes contacts 54a and 54b capable of controlling operation of the motor during the opening and closing cycles. An adjustable door opening cushioning resistor 55 is cut into the motor control circuit by operation of the limit switch 46 near the end of the opening cycle. A door closing cushion resistor 56 is connected across the armature 24b during the entire door closing cycle to operate the door at a slower speed. In order to prevent excessive arcing of contact of limit switches 47 and 48 during normal operation, and contact of relay 54 at mid stroke reversals, a rectifier 57 is connected across the motor field. Accordingly, the limit switches, the motor control relay, the rectifier and the cushioning resistors are mounted on the mounting plate 23 of the door operator. Additionally, a three-pole bypass toggle switch 58 is mounted on the mounting plate 23 and provided with switch contacts 58a, 58b and 53c for disabling the motor and the control circuit and bypassing the signal circuit when it is desired to eliminate any one door operator from the electrical system of the car. Leads 59 and 60 for the signal circuit connect into the traction interlock and signal light system of the car. Power is provided in the motor control circuit 45 by the positive line 61 and the negative line 62.

During normal operation of the door operation, the toggle switch 58 will be in the "on" position and the other switch contacts of the limit switches will assume the positions shown in FIG. 6. A door open signal on the train line 55 will energize the motor control relay 54 and swing the switch arms 54a and 54b to the opposite positions, thereby connecting the field and armature of the motor series across the positive and negative lines 61 and 62 to drive the door opener to open position for opening of the door 11. As the drive arm 28 moves away from the stop 53, it will simultaneously close the switch contacts 48b and open the switch contacts 48c of the limit switch to condition the motor control circuit for the closing cycle and to open the signal circuit 49. Opening of the contacts 48c will operate the traction interlock and signal light system of the car to indicate the door as not being in closed position and to prevent operation of the traction system. Before the door operator reaches fully open position, the cam 50 will close the limit switch 46 connecting the cushioning resistor 55 across the armature 24b to reduce the speed of the motor 24. Further movement of the cam 50 on the multiplying lever 32 will actuate the door open motor cut-out switch 47 to deenergize the motor and allow the door operator to come to a stop at its fully opened position.

Figure 7:
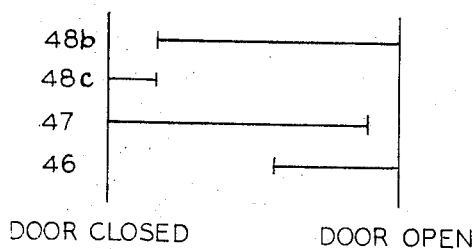
FIG. 7 is a chart illustrating the operation of the limit switches for the door operator during the door opening and closing cycles.

Thereafter, removal of the door opening signal on the train line 55 deenergizes the motor control relay 54 to swing the switch arms 54a and 54b to the positions shown in FIG. 6, and with the switch contacts 48b now being closed cause the motor to be connected across the power lines 61 and 62 to drive the door operator in the opposite direction to its closed position to close the door 11. During the closing cycle, the speed of the motor will be reduced by the cushioning resistor 56, which is connected across the armature 24b. Upon reaching the closed position, the drive arm 28 will engage against the stop 53 and open the contacts 48b of the limit switch 48 to deenergize the motor. At the same time, the contacts 48c are closed in the signal circuit 49 to allow the traction system to operate and to indicate by the signal light to the operator that the door is closed. The operation of the limit switches relative to the travel of the door is illustrated in the chart of FIG. 7, wherein the solid lines indicate where the switch contacts are closed.

Figure 2:
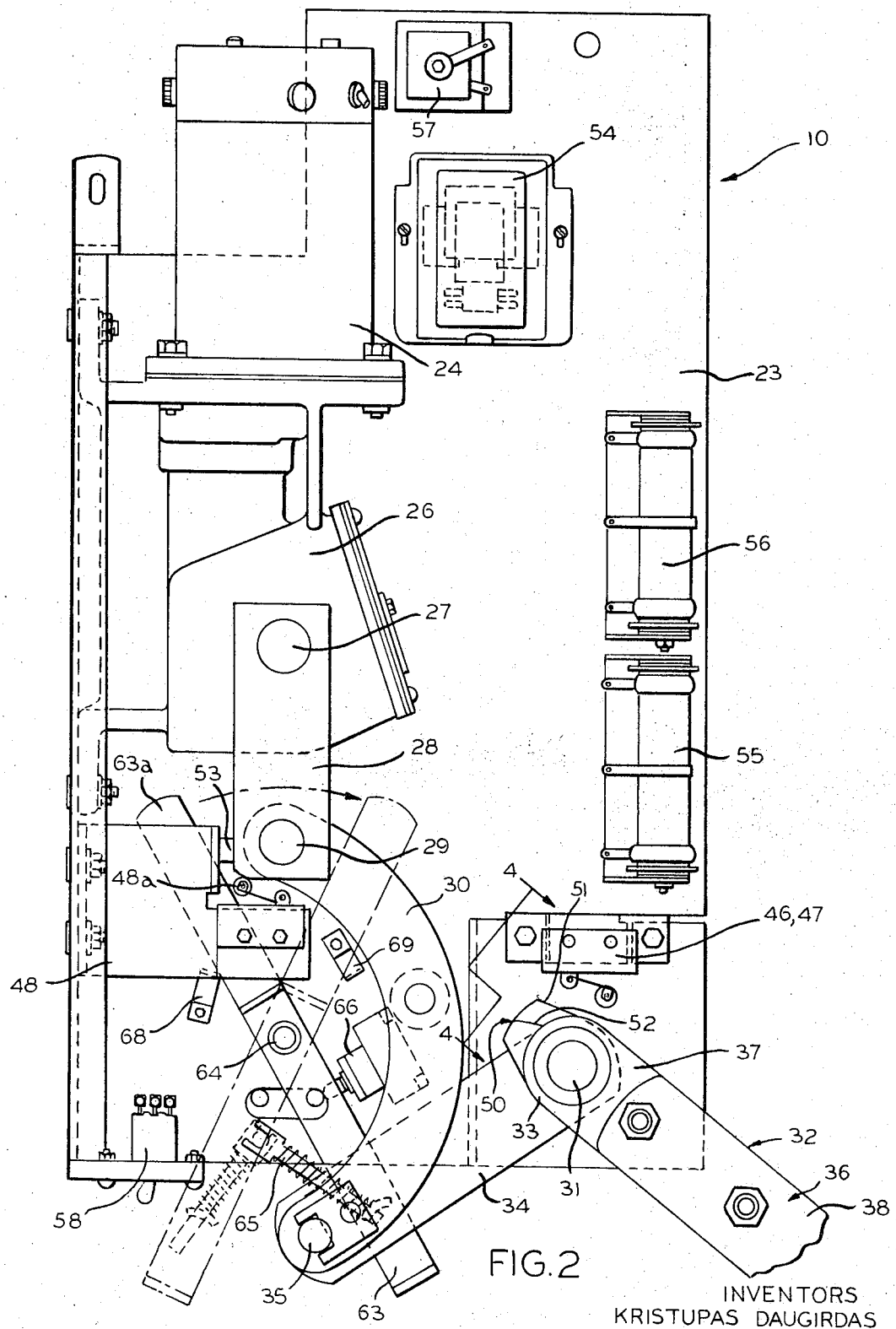
FIG. 2 is an enlarged side elevational view of the door operator according to the invention and illustrating the manual emergency release handle in its normal position in solid lines and in its operated position in dotted lines.

In order to permit manual opening of the door 11, an emergency release handle 63 may be optionally provided for any or all of the door operators. The handle is pivoted at about its center on a pin 64 carried on the mounting plate 23. A toggle linkage 65 is mounted on the mounting plate and the handle to hold the handle in its position as shown in solid lines or its position as shown in dotted lines. The handle, in its normal position as shown in solid lines (FIG. 2), engages a plunger switch 66 to a normally closed position, which switch is located in the motor control circuit as shown in FIG. 6. Initial pivoting of the emergency release handle in a clockwise direction opens the switch 66 to open the motor control circuit and prevent energization thereof during manual operation of the door. Further movement of the emergency handle in a clockwise direction causes the upper end 63a to engage a pin 67 (FIG. 3) on the drive arm-connecting link pivot connection 29 to force the pivot connection 29 back over center and allow the door to be manually opened. Handle stops 68 and 69 coact with the handle and the toggle linkage 65 to stop the handle in either of its positions as shown in FIG. 2. Thus, safe manual operation of the door can be obtained by operation of the emergency release handle.

It will be understood that modifications and variations may be effected without departing from the scope of the modern concepts of the present invention, but it is understood that this application is to be limited only by the scope of the appended claims.

we claim:

1. In a vehicle having a floor, a ceiling, side and end walls and a door opening in a side wall with a slidable door selectively movable between open and closed positions relative to said door opening, said side wall having inner and outer panels, a door operator for driving said door between open and closed positions, said door operator being mounted above the floor and within the side wall between the inner and outer panels and adjacent to the door and including a mounting panel, a reversible motor mounted on said panel with its axis of rotation extending substantially vertical, a gear box mounted on the lower end of the motor and in driving relation therewith, an output shaft in the gear box extending normal to the axis of the motor and substantially transverse the vehicle wall, a drive arm secured to said output shaft and extending normal thereto, a crescent-shaped connecting link pivotally connected at one end to the free end of said drive arm, said link being positioned below said gear box when the door is in closed position and laterally thereof when the door is in open position, a multiplying lever pivotally mounted on a shaft extending from the mounting panel and being parallel to the output shaft of said gear box, said lever including a hub bearingly received on said shaft, a first arm extending from said hub and pivotally connected at its free end to the other end of said connecting link, a second arm extending from said hub and being angularly related to said first arm, a connecting rod pivotally connected at one end to the free end of said second arm and at the other end to said door, and said drive arm, said connecting link, said lever, said connecting rod and door moving through parallel extending planes, means for positioning the pivot between the drive arm and the connecting link to over center position relative the output shaft axis and the pivot between the connecting link and the first arm of the multiplying lever when the door is in closed position to lock the door against movement.

2. The combination as defined in claim 1, wherein the vertical center line of said connecting link moves through a plane that is substantially centrally within said side wall.

3. The combination as defined in claim 1, wherein said positioning means includes a stop against which the drive arm abuts when the door is in closed position, and the drive arm and connecting link pivots permit movement of the pivot between the drive arm and connecting link to over center position, when the drive arm abuts against the stop to lock the door against movement.

4. The combination as defined in claim 3, and an emergency release handle mounted on said panel for manually driving said drive arm-connecting link pivot back over center to permit the door to be manually opened.

5. The combination as defined in claim 4, and toggle means for maintaining said handle in nonactuated position.

6. The combination as defined in claim 1, and cam means secured on and rotatable with said hub, first and second switches operable by said cam means to cushion the end of the door opening cycle and to deenergize the motor at the end of the door opening cycle, and a third switch operable by said drive arm at the end of the door closing cycle to deenergize the motor.

7. The combination as defined in claim 6, wherein said cam means is constructed to first actuate the cushion switch and then the door opening motor deenergization switch.

8. The combination as defined in claim 4, and a normally closed switch actuated by operation of the emergency release handle to open the circuit to the motor and prevent energization thereof during manual operation of the door.

9. In a vehicle including a floor, a ceiling, side and end walls, a door opening in a side wall having inner and outer panels defining a pocket adjacent the opening and a pocket extension juxtaposed to said pocket, and a door selectively movable between open and closed positions relative to said door opening and moving into said pocket when in open position, a door operator for driving said door between open and closed positions, said door operator extending vertically and being mounted within said pocket extension and substantially above the floor and comprising a reversible motor mounted with its axis of rotation extending substantially vertical, a gear box on the lower end of the motor and in driving relation therewith, an output shaft in the gear box extending normal to the axis of the motor and substantially transverse the side wall, a drive arm secured to said output shaft and extending normal thereto, said drive arm movable through an arc of about 150°, a crescent-shaped connecting link pivotally connected at one end to the free end of the drive arm, the convex side of said link generally facing the door opening during movement, and at the open and closed positions of the door, said link being positioned below said gear box when the door is in closed position and laterally thereof on the door opening side when the door is in open position, a shaft below said gear box extending parallel to the output shaft thereof, a multiplying lever pivotally mounted on said shaft including a hub bearingly received on the shaft, a first arm extending from said hub and pivotally connected at its free end to the other end of said connecting link, a second arm extending from said hub and being angularly related to the first arm, a connecting rod pivotally connected at one end to said door and at the other end to the free end of said second arm, and said drive arm connecting link multiplying lever and connecting rod moving through parallel extending planes.

10. The combination as defined in claim 9, wherein a stop is provided against which the drive arm abuts when the door is in closed position, and the relationship of the drive arm and connecting link pivots being such that the drive arm-connecting link pivot is over center when the drive arm abuts the stop to lock the door against movement toward open position.

11. The combination as defined in claim 10, the combination as defined in claim 1, and cam means secured on and rotatable with said hub, first and second switches operable by said cam means to cushion the end of the door opening cycle and to deenergize the motor at the end of the door opening cycle, and a third switch operable by said drive arm at the end of the door closing cycle to deenergize the motor.

12. The combination as defined in claim 11, wherein said cam means is constructed to first actuate the cushion switch and then the door opening motor deenergization switch.

13. The combination as defined in claim 9, and a pivotally mounted emergency release handle for manually driving said drive arm-connecting link pivot back over center to permit the door to be manually opened.

14. The combination as defined in claim 13, a normally closed motor circuit switch adjacent and operable by said emergency release handle, said switch being actuated to open the motor circuit when driving said handle to open the door thereby preventing energization of the motor during manual operation of the door.

15. The combination as defined in claim 11, wherein said third switch also controls a traction interlock circuit for the vehicle.

16. The combination as defined in claim 9, wherein all of said door operating components are arranged within a space having a depth about equal to the depth of the motor.

17. In a vehicle having a door opening and a door selectively movable between open and closed positions relative to said door opening, a door operator for driving said door between open and closed positions, said door operator comprising a reversible motor having a vertically extending shaft axis, a gear box mounted to the lower end of the motor having a horizontally extending output shaft, a drive arm on said output shaft, an arcuate connecting link pivotally connected at one end to said drive arm, a multiplying lever pivotally mounted on a shaft extending parallel to the axis of the output shaft, said lever including a first arm extending from the shaft and being pivotally connected at its free end to the other end of the connecting link and a second arm extending from the shaft and extending at an angle to the first arm, a connecting rod pivotally connected at one end to the free end of said second arm and at the other end to the door, and means for positioning the pivot between the drive arm and the connecting link to over center position relative the output shaft axis and the pivot between the connecting link and the first arm of the multiplying lever when the door is in closed position to lock the door against movement.

Disclaimer 3,537,403.—*Kristupas Daugirdas*, *Wilmette*, and *Charles J. Jechort, Jr.*, Berwyn, Ill. DOOR OPERATOR. Patent dated Nov. 3, 1970. Disclaimer filed Mar. 4, 1976, by the assignee, *Vapor Corporation*.

Hereby enters this disclaimer to all claims of said patent.

[*Official Gazette May 25, 1976.*]